Patented Aug. 20, 1935

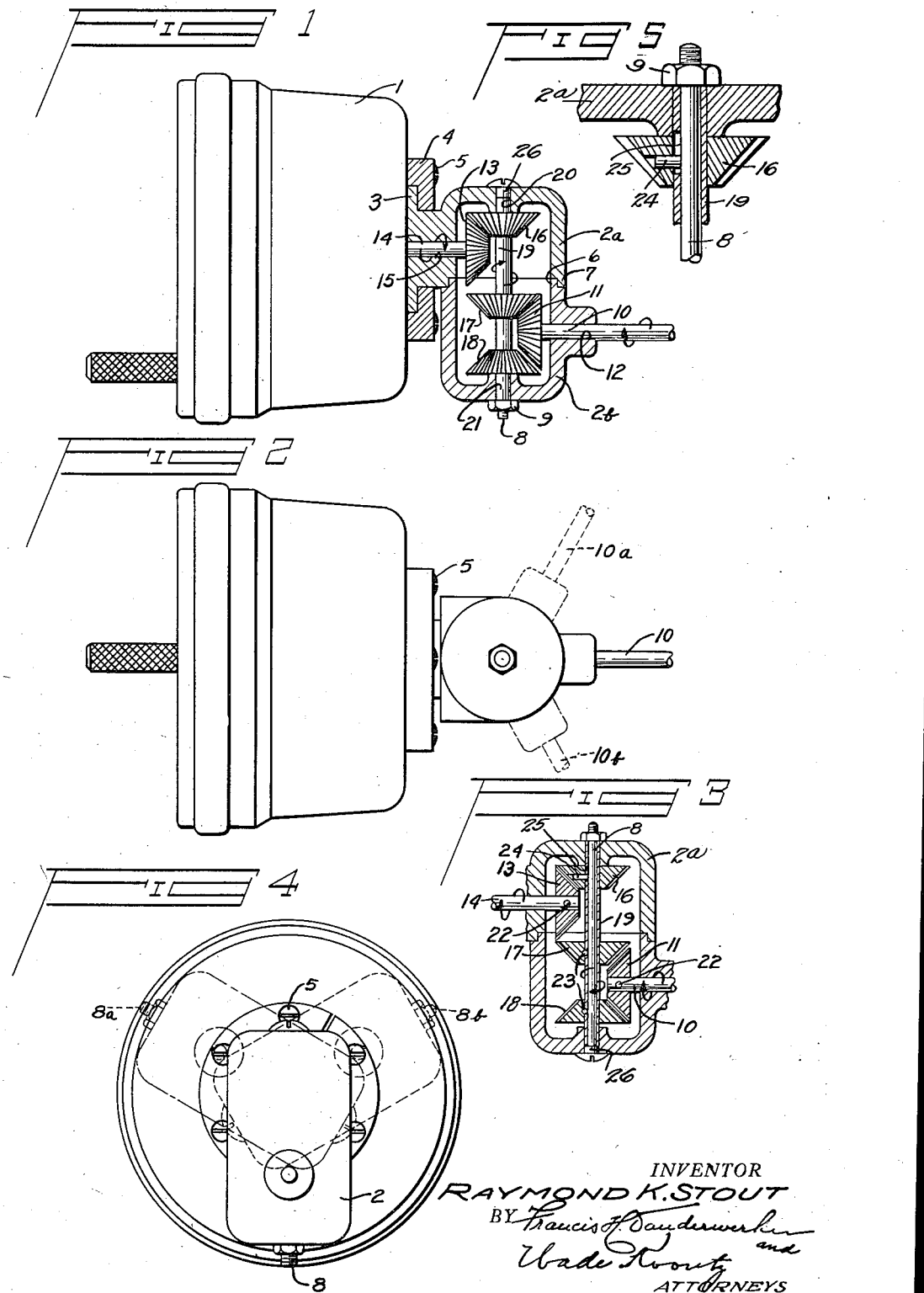

2,011,597

UNITED STATES PATENT OFFICE 2,011,597

ADJUSTABLE CONNECTER

Raymond K. Stout, Dayton, Ohio

Application October 13, 1933, Serial No. 693,487

3 Claims. (Cl. 74—423)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to an adjustable universal joint designed for use in conjunction with automotive and aircraft instruments, such as speedometers, tachometers, and the like.

It is an object of my invention to provide for maximum longitudinal and lateral adjustment of the driving shafts of speedometers, tachometers and the like.

It is another object of my invention to provide means whereby the direction of rotation of driving shafts may be readily reversed.

With the foregoing and other objects in view, which will appear as the description proceeds, the invention consists in certain new and novel impovements in adjustable connecter, which will be hereinafter more fully illustrated and described in the accompanying drawing and more particularly pointed out in the appended claims.

Referring to the drawing, in which numerals of like character designate similar parts throughout the several views:

Fig. 1 is a side view of my invention adjusted to reverse drive shaft rotation;

Fig. 2 is a plan view of my invention showing range of longitudinal adjustment; and Fig. 3 is a side view of my invention adjusted to retain drive shaft rotation;

Fig. 4 is an end view of my invention showing range of lateral adjustment.

Fig. 5 is an enlarged view of the upper portion of Fig. 3.

Fig. 1 shows application of my invention to the rear of a speedometer 1. A housing portion 2a is rotatably secured to the speedometer 1 by means of a flange 3, a locking ring 4 and screws 5. The housing portion 2a is further rotatably secured to a housing portion 2b by means of annular shoulders 6 and 7, a bolt 8 and a nut 9. A driving shaft 10 and driving gear 11 are secured to the housing portion 2b by means of a bearing 12, while a driven gear 13 and driven shaft 14 are similarly secured to the housing portion 2a by means of a bearing 15. Intermediate beveled gear 16 is freely slidably secured to a sleeve 19 by means of splines or other suitable holding means referred to hereinafter. Intermediate beveled gears 17 and 18 are fixedly secured to the sleeve 19 by means of splines or other suitable holding means. The sleeve 19 is rotatably supported in the housing 2 by means of bearings 20 and 21, and is further secured against longitudinal movement by means of the bolt 8 and the nut 9. It will be noted that the driving gear 11 is in operable engagement with the intermediate gear 17 and that the intermediate gear 16 is in operable engagement with driven gear 13 such that clockwise rotation of the driving shaft 10 will produce counter-clockwise rotation of the driven shaft 14. It will be further noted that the driving shaft 10 may be adjusted about the longitudinal axis of the bolt 8 in a series of settings angularly disposed with reference to the longitudinal axis of the speedometer 1. Two of such series of angular settings are shown in Fig. 2 and designated 10a and 10b.

In Fig. 3, the bevel gears and sleeve 19 of Fig. 1 are shown in cross-section to illustrate the manner of their attachment. The bevel gears 11 and 13 are fixedly secured to the shafts 10 and 14 by means of pins 22. The intermediate gears 17 and 18 are fixedly secured to the sleeve 19 by means of pins 23. The intermediate gear 16 is slidably secured to the sleeve 19 by means of a pin 24 and a longitudinally disposed slot 25. An enlargement of the upper portion of Fig. 3 is shown in Fig. 5. It will be noted that the slot 25 is of sufficient length to permit alternate positionings of the lower end of the sleeve 19 flush with the bottom surface of the housing portion 2b, as shown in Fig. 1, or of the upper end of the sleeve 19 flush with the top surface of the housing portion 2a, as shown in Fig. 3. The purpose of the aforementioned sleeve shifting is to obtain alternate engagement of the intermediate gear 17, then 18, with the driving gear 11; the former engagement producing counter-clockwise and the latter engagement clockwise rotation of the driven shaft 14, as viewed from the rear of the speedometer 1. It will be further noted that both of the aforementioned engagements are effected from without the housing 2, through the simple expedient of downward or upward insertion of the bolt 8, which is provided with a shoulder 26, equal in outside diameter to the outside diameter of the sleeve 19.

Fig. 4 shows how the outer extremity of the housing 2 may be swung through an angular adjustment of 360 degrees.

I claim:

1. In an adjustable connecter having cup shaped coaxially disposed housings with inner engaging ends forming annular shoulders and outer solid ends provided with coaxially disposed journals, a driven shaft journalled to one of said housings and carrying a driven gear, a driving shaft journalled to said other housing and carrying a driving gear, a sleeve of predetermined length freely revolvable and slidably adjustable within the overall confine of said end journals, an intermediate gear freely slidably carried at one end of said sleeve in constant mesh with said driven gear, a second intermediate gear fixed to the mid portion and a third intermediate gear fixed to the other end of said sleeve such that but one of the aforesaid intermediate gears may be selectively meshed at any one time with said driving gear, and means for effecting selective adjustment of said sleeve within the end journals supporting the same.

2. In an adjustable connecter having cup shaped coaxially disposed housings with inner engaging ends forming annular shoulders and outer solid ends provided with coaxially disposed journals, a driven shaft journalled to one of said housings and carrying a driven gear, a driving shaft journalled to said other housing and carrying a driving gear, a sleeve of predetermined length freely revolvable and slidably adjustable within the overall confine of said end journals, an intermediate gear freely slidably carried at one end of said sleeve in constant mesh with said driven gear, a second intermediate gear fixed to the mid portion and a third intermediate gear fixed to the other end of said sleeve such that but one of the aforesaid intermediate gears may be selectively meshed at any one time with said driving gear and means for simultaneously securing said housings in assembled engagement and effecting predetermined end adjustments of said sleeve within the end journals supporting the latter.

3. In an adjustable connecter having cup shaped coaxially disposed housings with inner engaging ends forming annular shoulders and outer solid ends provided with coaxially disposed journals, a driven shaft journalled to one of said housings and carrying a driven gear, a driving shaft journalled to said other housing and carrying a driving gear, a sleeve of predetermined length freely revolvable and slidably adjustable within the overall confine of said end journals, an intermediate gear freely slidably carried at one end of said sleeve in constant mesh with said driven gear, a second intermediate gear fixed to the mid portion and a third intermediate gear fixed to the other end of said sleeve such that but one of the aforesaid intermediate gears may be selectively meshed at any one time with said driving gear and a bolt having its body portion journalled partially within said sleeve and partially within one or the other of said end journals for simultaneously securing said housings in assembled engagement and effecting engagement of said driving and second intermediate gears when the threaded end of said bolt is adjacent said third intermediate gear or effecting engagement of said driving and third intermediate gears when the threaded end of said bolt is adjacent said driven gear.

RAYMOND K. STOUT.